United States Patent [19]

Alten

[11] Patent Number: 5,481,773
[45] Date of Patent: Jan. 9, 1996

[54] RAMP BRIDGING MEMBER

[76] Inventor: Kurt Alten, Ringstr. 14, D-30974 Wennigsen, Germany

[21] Appl. No.: 402,101
[22] Filed: Mar. 10, 1995
[30] Foreign Application Priority Data Mar. 10, 1994 [DE] Germany ............... 44 08 069.7

[51] Int. Cl.$^6$ .............................. E01D 15/00
[52] U.S. Cl. .............................. 14/69.5; 14/71.5
[58] Field of Search .............. 14/69.5, 70, 71.1, 14/71.3, 71.5; 256/1, 13.1, 24; 414/401, 584

[56] References Cited

U.S. PATENT DOCUMENTS

| | | | |
|---|---|---|---|
| 4,328,602 | 5/1982 | Bennett | 14/71.3 |
| 4,727,613 | 3/1988 | Alten | 14/71.1 |
| 4,862,547 | 9/1989 | Alten | 14/71.7 |

Primary Examiner—Ramon S. Britts
Assistant Examiner—Pamela A. O'Connor
Attorney, Agent, or Firm—Robert W. Becker & Associates

[57] ABSTRACT

The ramp bridging member has a bridge plate connected to ramp so as to be pivotable about a horizontal axis It has a free end. An extension with a substantially vertical leg 14 is provided with which the extension is connected to the free end of the bridge plate. The extension is extendable from a rest position in a longitudinal direction of the bridge plate for resting on a vehicle platform to be loaded and unloaded and is retractable in the longitudinal direction into the rest position. A plurality of parallel support beams extending in the longitudinal direction of the bridge plate is provided. The support beams are extendable and retractable together with the extension. Each one of the support beams has a front end and a rear end. A vertical plate is connected to the front end of the support beams. The vertical leg engages in a hook-like manner a bottom edge of the vertical plate.

12 Claims, 2 Drawing Sheets

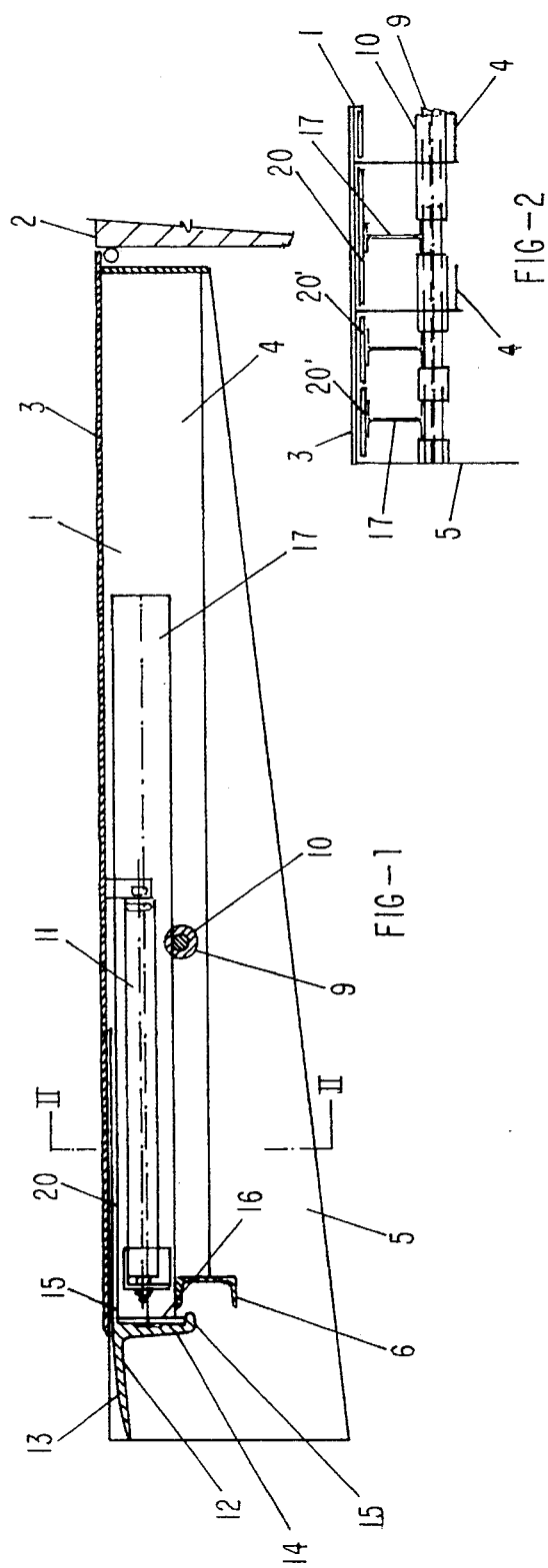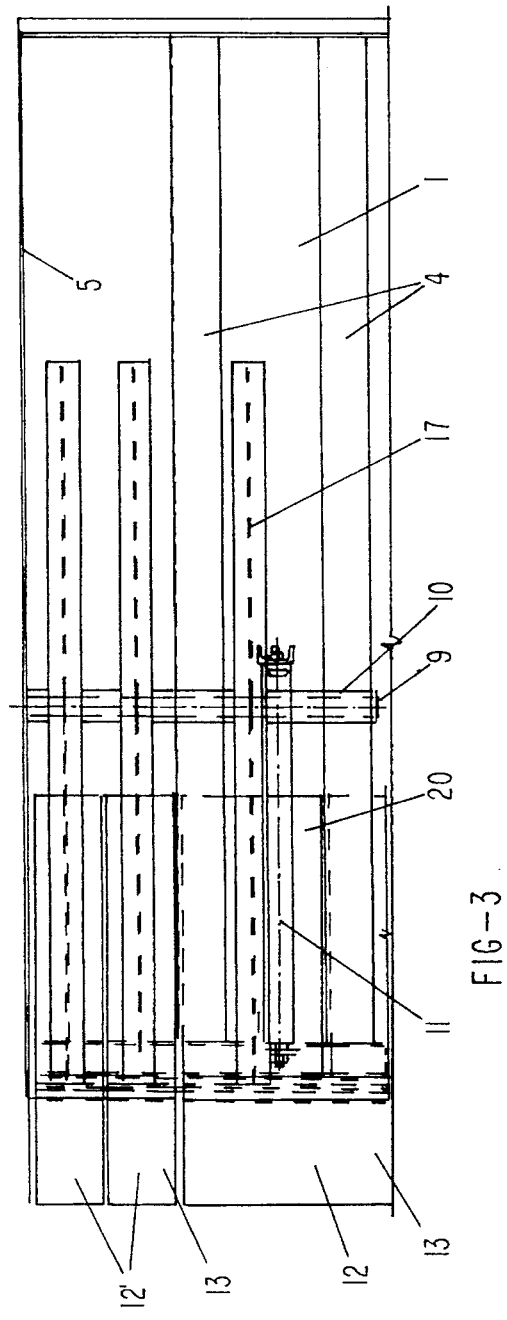

RAMP BRIDGING MEMBER

BACKGROUND OF THE INVENTION

The present invention relates to a ramp bridging member with a bridge plate that, with its end facing the ramp, is supported so as to be pivotable about a horizontal axis at the ramp and has an extension that is provided at the free end of the bridge plate. The extension is displaceable in the longitudinal direction of the bridge and can be extended and retracted for being supported on the vehicle that is to be loaded or unloaded. The basically vertical rear leg thereof is attached to the front end of a plurality of lengthwise moveable support beams which are arranged in the longitudinal direction of the ramp bridge member parallel to one another.

With known ramp bridging members of this kind the basically vertical rear leg of the extension is formed as a strong plate and is directly connected with its end face to the front ends of the aforementioned support beams by welding. This arrangement and attachment of the vertical rear leg requires a very accurate finishing and manufacturing process; tolerances and deformations that occur during manufacturing or operation of the bridge cannot be compensated anymore. This can also put at risk the slidability of the extension with the relatively long support beams, which extend toward the rear.

The object of the present invention is to simplify the manfacturing process of the extension and the support beams which are arranged parallel to one another to the rear thereof and to provide for compensatory deformations during manufacturing and/or operation without causing disadvantages concerning the strength and stability.

SUMMARY OF THE INVENTION

The ramp bridging member according to the present invention is primarily characterized by:
- a bridge plate connected to ramp so as to be pivotable about a horizontal axis and having a free end;
- an extension comprising a substantially vertical leg 14 with which the extension is connected to the free end;
- the extension being extendable from a rest position in a longitudinal direction of the bridge plate for resting on a vehicle platform to be loaded and unloaded and being retractable in the longitudinal direction into the rest position;
- a plurality of parallel support beams extending in the longitudinal direction of the bridge plate, the support beams extendable and retractable together with the extension;
- each one of the support beams having a front end and a rear end;
- a vertical plate connected to the front end of the support beams; and
- the vertical leg engaging in a hook-like manner a bottom edge of the vertical plate.

Preferably, the vertical leg engages an upper edge of the vertical plate.

Expediently, the extension is an extrusion press member and wherein the vertical leg as at least one arc-shaped projection for engaging the vertical plate.

The ramp bridge member preferably further comprises parallel bearing members for stiffening the bridge plate and vertical side plates connected to the bridge plate and extending in the longitudinal direction of the bridge plate. Furthermore, plates are connected to an upper, forward portion of the support beams adjacent to the extension. The plates preferably have a width substantially equal to a spacing between the bearing members and a spacing between the bearing members and the side plates of the bridge plate.

The ramp bridge member expediently further comprises a transverse bar fixedly connected to the bearing members and the side plates of the bridge plate, wherein a rearward portion of the support beams is supported on the bar. Sleeves are slipped onto the transverse bar for laterally guiding the support members.

In another embodiment of the present invention, the ramp bridge member further comprises parallel bearing members for stiffening the bridge plate, the bearing members terminating with a front end thereof at the free end of the bridge plate, and a transversely extending support with two ends, wherein the front ends of the bearing members are fixedly connected to the support and the two ends of the support are fixedly connected to the side plates.

Expediently, the extension is slidable onto the vertical plate transverse to the longitudinal direction.

The vertical leg is advantageously fastened with a screw connection to the vertical plate and the extension is removable from the vertical plate after releasing the screw connection.

Advantageously, a back of the vertical leg rests at an upper portion of the end face of the front end of the support beams.

The ramp bridge member expediently further comprises a flat-bar steel connected to an upper portion of the end face of the front end of the support beams, wherein the back of the vertical leg rests at the flat-bar steel.

Preferably, the extension comprises a support member having a rearwardly projecting nose covering the front end of the support beams. The support member preferably rests on the front end of the support beams.

According to the invention, the approximately vertical leg of the extension engages hooklike the bottom edge of a plate which is mounted at the end faces of the support beams. By this measure no direct attachment of the vertical leg of the extension is provided but an indirect attachment. The vertical leg can additionally engage hooklike the upper edge of the plate. In case that only a hooklike connection is provided at the bottom of the vertical leg, it is advantageous to secure this leg additionally by a screw connection.

The above mentioned plate that is attached to the end faces of the support beams is resistant to action of force from above, but relatively soft in case of normal forces (i.e., perpendicular to the end faces). This bending softness provides compensatory deformations, e.g. in case of tolerances when a plurality of the long support beams have to be attached in parallel to the plate. Such compensatory deformations can also occur if cantings or similar deformations are created during the operation of the bridge, e.g. shrinking or expansion stresses, or also because of flexible deformations, deformations that occur when the bridge is operated, or the like. Moreover, the hooklike connection has the great advantage that the installation of the extension can be performed by sliding it transversely with respect to the longitudinal dimension of the bridge.

The invention also provides the opportunity to manufacture the plate—like the support beams— out of steel while the extension with the horizontal, projecting part and the approximately vertical leg can be manufactured out of aluminum in the shape of a continuous profiled member.

This construction of the extension with its longitudinal support beams, furthermore, makes it possible to simplify the rear support for the support beams substantially. Expediently, for this support action a round bar is provided that extends from one side plate of the bridge plate to the other and penetrates the bearing members of the bridge plate. The round bar is laterally, i.e., next to the supporting area for the support beams, provided with sleeves that are slipped on and ensure an appropriate side guidance of the support beams when the extension is retracted and extended.

BRIEF DESCRIPTION OF THE DRAWINGS

The object and advantages of the present invention will appear more clearly from the following specification in conjunction with the accompanying drawings, in which:

FIG. 1 illustrates a longitudinal section of a ramp bridging member in its rest position;

FIG. 2 illustrates a part-sectional view along line II—II of FIG. 1;

FIG. 3 illustrates a part-sectional view of the ramp bridge member according to FIG. 1, from below.

DESCRIPTION OF PREFERRED EMBODIMENTS

Figure 4:
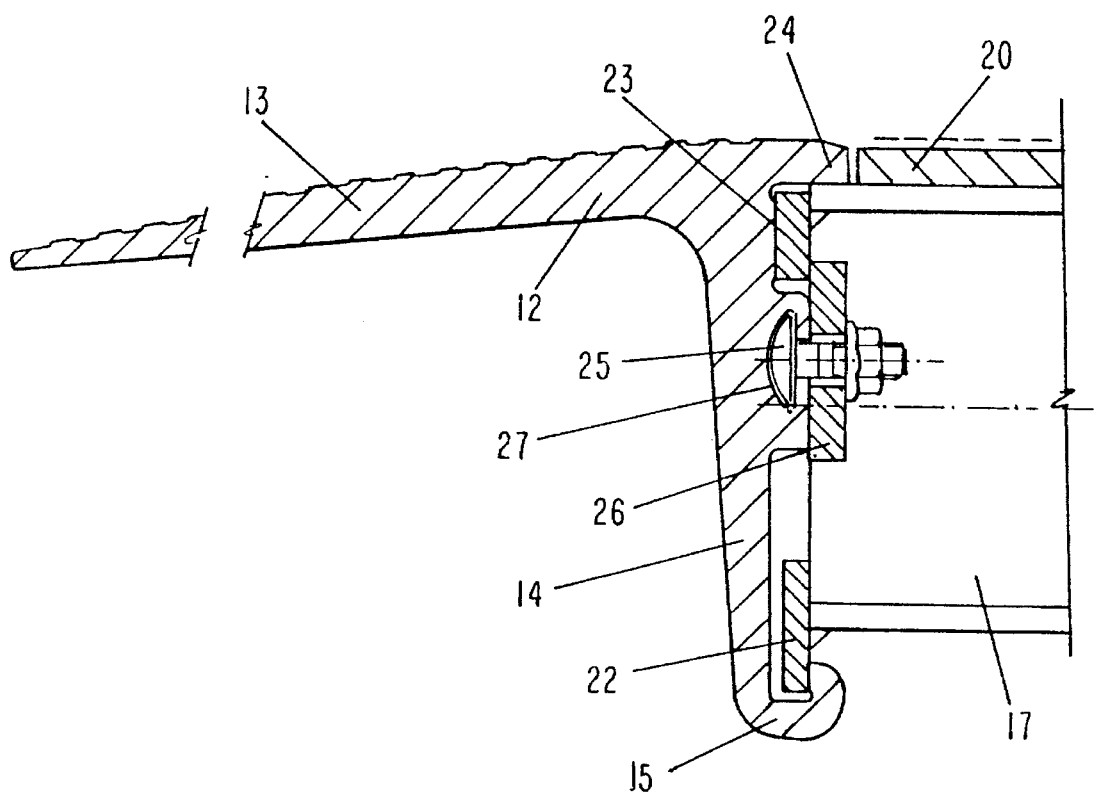
FIG. 4 illustrates a longitudinal section of an extension and its support of a modified ramp bridging member.

The present invention will now be described in detail with the aid of several specific embodiments utilizing FIGS. 1–4.

The bridge plate 1 is, at its rear end facing the ramp supported at the ramp 2 so as to be pivotable about a horizontal axis. It has a cover sheet 3 and, beneath this sheet, L-shaped bearing member 4 for reinforcement which extend longitudinally to a location near the front edge or free end of the bridge plate 1. On both sides the bridge plate 1 is shielded by vertical side plates 5 which are also designed as protective shields.

At the front in the bottom area the bearing pro members 4 are fixedly connected by their end faces to a U-shaped support 6 which extends transversely and the ends of which are fixedly mounted on the two side plates 5. The two legs of the U-shaped support beam 6 are facing toward the front; therefore, the end faces of the bearing members 4 fully rest against the back side of the U-shaped support 6. Behind the U-shaped support 6, at approximately one third of the bridge length (in front view), a further cross-connection is provided in the bottom area of the bearing member 4, namely a transverse round bar 9 which penetrates the individual bearing member 4, is connected to them, and is mounted with its ends on the side plates 5. Onto this round bar 9 a large number of sleeves 10 are slipped the purpose of which is to be explained in the following.

The bridge plate 1 provides a retractable and extendable extension 12 which is movable in the longitudinal direction of the bridge by means of a working cylinder 11. The support member 13 of the extension, which rests on the vehicle platform for loading and unloading, is positioned approximately in the bridge plane. The leg 14 which is positioned at the rear of the extension 12 is aproximately vertical and, in general, can serve as a stop. The extension 12 is made out of aluminum or the like as an extrusion press member and provides arc-shaped projections or claws 15 at both ends of the leg 14 which face backward. The claws 15 engage a vertical plate or flat-bar steel 16 in order to attach the extension 12 to this flat-bar steel 16. At the rear side of the flat-bar steel 16 parallel support beams 17 are fixedly mounted which are spaced along the width of the bridge and stretch in the longitudinal direction of the bridge. With their front end the support beams 17 rest on the U-shaped support 6, and approximately at half length they are supported on the round bar 9. In order for the support beams 17 to keep their parallel position, however, the above mentioned sleeves 10 are respectively provided at both sides of the support beams 17 and form spacers relative to the neighboring members, e.g. the bearing members 4.

The rear ends of the working cylinders 11 are connected to the sheet metal cover 3, and their front ends engage the extension 12 for extending it, respectively, for retracting it into the rest position according to the drawing of FIG. 1 subsequent to operating the bridge.

It is understood that a lifting or swiveling cylinder may also be associated with the bridge plate 1. Such a cylinder can also be provided, as is known per se, in a twin arrangement.

It is important that the support beams 17 which form the slide for the extension 12 can be manufactured as a construction unit in combination with the flat-bar steel 16 which is positioned on edge. The extension 12 can then be slipped on as a shaped part or pressing.

The extension 12 can extend across the entire width of the bridge; however, it is possible to provide the extension 12 in sections, e.g. the two illustrated sections 12', each having a support beam 17 and respectively also a section of the support member 13 associated therewith.

It should be mentioned furthermore that bending resistant plates 20 are provided on top of the support beams 17, as an extension of the support member 13. These plates 20 are fixedly mounted on the support beams 17. They fill out the spaces between the neighboring bearing member 4, respectively, a single bearing member 4 and the neighboring vertical side plate 5 and provide the possibility for extending the extension 12. Thus, the extension 12 can be extended to the point that the rear end of the plates 20 abuts the front end of the sheet metal cover 3. If sections 12' are provided, corresponding plate sections 20' have to be attached to the respective support beams 17.

The great strength and stability of the bridge plate 1 results from the fact that the bearing members can extend up to the front end of the cover sheet 3.

In the embodiment according to FIG. 4 the leg 14 is provided with a claw 15 only at its bottom end. The claw 15 engages the bottom edge of a flat-bar steel 22 which is welded on the end face of the support beams 17. To the upper end of the end face of the support beams 17 a further flat-bar steel 23 is welded which, however, only acts as a support for the leg 14. Additionally, the support member 13 is provided with a nose 24 that extends to the rear, with its front rests on the support beam 17, and covers the flat-bar steel 22. For securing the extension 12 against a reciprocating shifting the leg 14 is screwed against a flat bar 26 with the aid of a bolt 25. The flat bar 26 is also fixedly connected to the support beams 17. By loosening the bolt 25, the extension 12 can be removed by pulling it laterally and, if necessary, be replaced; for this purpose the head of the bolt 25 can be arranged within a longitudinal groove 27 of the leg 14. The only purpose of the bolt 25 is to prevent an unvoluntary tilting of the extension 12.

The present invention is, of course, in no way restricted to the specific disclosure of the specification, examples and drawings, but also encompasses any modifications within the scope of the appended claims.

What I claim is:

1. A ramp bridging member comprising:

a bridge plate connected to a ramp so as to be pivotable about a horizontal axis and having a free end;

an extension comprising a substantially vertical leg with which said extension is connected to said free end;

said extension being extendable from a rest position in a longitudinal direction of said bridge plate for resting on a vehicle to be loaded and unloaded and being retractable in the longitudinal direction into said rest position;

a plurality of parallel support beams extending in the longitudinal direction of said bridge plate, said support beams extendable and retractable together with said extension;

each one of said support beams having a front end and a rear end;

a vertical plate connected to said front end of said support beams;

said vertical leg has at least one arc-shaped projection engaging bottom edge of said vertical plate in a hook-like manner.

2. A ramp bridging member according to claim 1, wherein said vertical leg engages an upper edge of said vertical plate.

3. A ramp bridge member according to claim 2, wherein said extension is an extrusion press member and wherein said vertical leg has at least one arc-shaped projection for engaging said vertical plate.

4. A ramp bridge member according to claim 1, further comprising:

parallel bearing members for stiffening said bridge plate;

vertical side plates connected to said bridge plate and extending in the longitudinal direction of said bridge plate;

plates connected to an upper, forward portion of said support beams adjacent to said extension;

wherein said plates have a width substantially equal to a spacing between said bearing members and a spacing between said bearing members and said side plates of said bridge plate.

5. A ramp bridge member according to claim 4, further comprising:

a transverse bar fixedly connected to said bearing members and said side plates of said bridge plate, wherein a rearward portion of said support beams is supported on said bar;

sleeves slipped onto said transverse bar for laterally guiding said support members.

6. A ramp bridge member according to claim 4, further comprising:

parallel bearing members for stiffening said bridge plate, said bearing members terminating with a front end thereof at said free end of said bridge plate; and a transversely extending support with two ends, wherein said front ends of said bearing members are fixedly connected to said support and said two ends of said support are fixedly connected to said side plates.

7. A ramp bridge member according to claim 1, wherein said extension is slidable onto said vertical plate transverse to said longitudinal direction.

8. A ramp bridge member according to claim 1, wherein said vertical leg is fastened with a screw connection to said vertical plate and wherein said extension is removable from said vertical plate after releasing said screw connection.

9. A ramp bridge member according to claim 1, wherein a back of said vertical leg rests at an upper portion of the end face of said front end of said support beams.

10. A ramp bridge member according to claim 1, further comprising a flat-bar steel connected to an upper portion of the end face of said front end of said support beams, wherein a back of said vertical leg rests at said flat-bar steel.

11. A ramp bridge member according to claim 1, wherein said extension comprises a support member having a rearwardly projecting nose covering said front end of said support beams.

12. A ramp bridge member according to claim 11, wherein said support member rests on said front end of said support beams.

* * * * *